United States Patent
Kokusho (10) Patent No.: US 8,950,926 B2
(45) Date of Patent: Feb. 10, 2015

(54) PLANAR LIGHT SOURCE APPARATUS AND DISPLAY APPARATUS USING THE SAME

(75) Inventor: Takafumi Kokusho, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 265 days.

(21) Appl. No.: 13/349,749

(22) Filed: Jan. 13, 2012

(65) Prior Publication Data
US 2012/0182759 A1 Jul. 19, 2012

(30) Foreign Application Priority Data

Jan. 19, 2011 (JP) .................................. 2011-008922
Sep. 6, 2011 (JP) .................................. 2011-194076

(51) Int. Cl.
F21V 7/04 (2006.01)
G09F 13/18 (2006.01)
F21V 8/00 (2006.01)
G09F 13/04 (2006.01)

(52) U.S. Cl.
CPC .............. *G09F 13/18* (2013.01); *G02B 6/0086* (2013.01); *G02B 6/0088* (2013.01); *G09F 13/0409* (2013.01); *G02B 6/0083* (2013.01); *G02B 6/0091* (2013.01)
USPC ............. 362/633; 362/621; 362/630; 362/631

(58) Field of Classification Search
CPC ... G02B 6/0083; G02B 6/0086; G02B 6/0088
USPC ......... 362/608, 609, 611, 612, 613, 621, 622, 362/630, 631, 632, 633, 634; 349/58
See application file for complete search history.

(56) References Cited

U.S. PATENT DOCUMENTS

| | | | | |
|---|---|---|---|---|
| 4,714,983 A | * | 12/1987 | Lang .............................. | 362/613 |
| 7,594,746 B2 | * | 9/2009 | Shin et al. ..................... | 362/633 |
| 7,922,380 B2 | * | 4/2011 | Park .............................. | 362/631 |
| 8,059,226 B2 | * | 11/2011 | Chang et al. .................... | 349/58 |
| 8,147,113 B2 | * | 4/2012 | Hamada ........................ | 362/631 |
| 2011/0305038 A1 | | 12/2011 | Kokusho | |

FOREIGN PATENT DOCUMENTS

JP 2007-279593 10/2007
JP 2009-205866 9/2009

OTHER PUBLICATIONS

U.S. Appl. No. 13/297,708, filed Nov. 16, 2011, Yuuki, et al.

* cited by examiner

*Primary Examiner* — Y M Lee
(74) *Attorney, Agent, or Firm* — Oblon, Spivak, McClelland, Maier & Neustadt, L.L.P.

(57) ABSTRACT

A planar light source apparatus includes a light source substrate including: a point light source; a mount part, on which the point light source is mounted; and a wiring part, which has a wiring pattern to supply power to the point light source; a frame including: one face, along which the mount part of the light source substrate is arranged: and an attachment part, which is formed on the one face, wherein the light source substrate has either of a cutout or hole at a position corresponding to the attachment part of the frame, and wherein an area of the wiring part is continuously provided from the mount part and is bent with respect to the one face.

11 Claims, 6 Drawing Sheets

PLANAR LIGHT SOURCE APPARATUS AND DISPLAY APPARATUS USING THE SAME

CROSS-REFERENCE TO RELATED APPLICATION

This application claims priority from Japanese Patent Application No. 2011-008922 filed on Jan. 19, 2011 and Japanese Patent Application No. 2011-194076 filed on Sep. 6, 2011, the entire subject matter of which are incorporated herein by reference.

TECHNICAL FILED

This disclosure relates to a planar light source apparatus using a point light source and a display apparatus using the same.

BACKGROUND

In a general planar light source apparatus of a side light type using a point light source, a flexible substrate, which is used as a light source substrate on which a point light source is mounted, is arranged on a side face of a frame (refer to JP-A-2009-205866 and JP-A-2007-279593).

SUMMARY

In the related planar light source apparatus of a side light type, when the light source substrate having the point light source mounted thereon is arranged on the side face of the frame, in case that an attachment part configured to attach to another member such as external housing is formed on the side face, the light source substrate contacts (interferes) with the attachment part formed on the frame. Accordingly, the light source substrate cannot be arranged, so that a degree of freedom of an arrangement position of the light source substrate, i.e., an arrangement position of the light source is to be restrained. On the other hand, when the attachment part configured to attach to another member is formed on a face other than the side face on which the light source is arranged, for example a rear face or upper face, the frame of the planar light source apparatus becomes larger or is thicker.

In view of the above, this disclosure provides a planar light source apparatus in which a degree of freedom of an arrangement position of a light source is not to be restrained. Additionally, this disclosure provides a planar light source apparatus with considering that a frame becomes larger or thicker due to an attachment part configured to attach to another member.

A planar light source apparatus of this disclosure comprises a light source substrate including: a point light source; a mount part, on which the point light source is mounted; and a wiring part, which has a wiring pattern to supply power to the point light source; a frame including: one face, along which the mount part of the light source substrate is arranged; and an attachment part, which is formed on the one face, wherein the light source substrate has either of a cutout or hole at a position corresponding to the attachment part of the frame, and wherein an area of the wiring part is continuously provided from the mount part and is bent with respect to the one face.

According to the planar light source apparatus of this disclosure, even when the attachment part configured to attach to another member is provided on one face of the frame, it is possible to arrange the light source substrate on the one face of the frame. Therefore, a degree of freedom of an arrangement position of the point light sources is not restrained. This disclosure also provides the planar light source apparatus of a thin type having a narrow frame.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Illustrative Embodiment

A configuration of a planar light source apparatus according to an illustrative embodiment of this disclosure will be described with reference to the drawings. Meanwhile, in the respective drawings, the same reference numerals will indicate the substantially same configurations.

<Configuration of Planar Light Source Apparatus>

Figure 1:
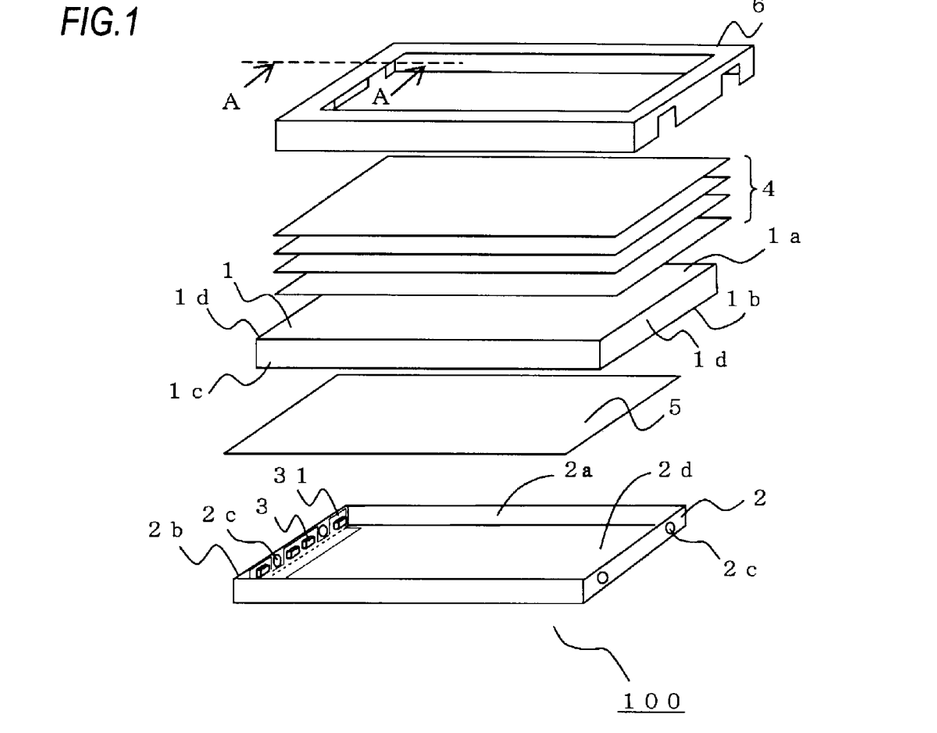
FIG. 1 illustrates an exploded perspective view of a planar light source apparatus of this disclosure.

FIG. 1 illustrates an exploded perspective view of a planar light source apparatus according to an illustrative embodiment of this disclosure. In FIG. 1, a planar light source apparatus 100 of this illustrative embodiment has a light guide plate 1 that guides light into a planar form and emits the light from an emitting face 1a. The light guide plate 1 is arranged in a rear frame 2, which has an opening 2a and has at least a side face 2b. In this illustrative embodiment, the rear frame 2 is a box-shaped frame that has a bottom face 2d continuing from the side face 2b. The light guide plate 1 emits the light toward the opening 2a and a direction thereof is an emitting direction. The light guide plate 1 has the emitting face 1a that emits the light, an opposite face 1b that is opposite to the emitting face 1a and side faces that are substantially perpendicular to both of the emitting face 1a and the opposite face 1b and connect the emitting face 1a and the opposite face 1b. In the meantime, as shown in FIG. 1, the light guide plate 1 that is used in this illustrative embodiment has a rectangular flat plate shape when seen from a plan view, and the light guide plate 1 has a pair of first side faces 1c and a pair of second side faces 1d, which are respectively opposite to each other. Point light sources 3, which emit the light, are arranged on one face opposite to the first side faces 1c and the second side faces 1d of the light guide plate 1. In this illustrative embodiment, the point light sources 3 are arranged on the second side face 1d that is a short side of the planar light source apparatus 100. Optical sheets 4 such as lens sheet and diffusion sheet that diffuses the light and are arranged on the emitting face 1a of the light guide plate 1 and a reflective sheet 5 is arranged on the opposite face 1b. The above members are sandwiched by the rear frame 2 and an intermediate frame 6, which is opposite to the rear frame and is made of resin or metal. Accordingly, the planar light source apparatus 100 is configured.

<Reflective Sheet>

It is used as the reflective sheet 5 that a component made of barium sulfate or titanium oxide mixed with polyethylene or polyethylene terephthalate, a component including fine pores formed in a resin, a component being a metal plate vapor-deposited by silver or a component being a metal plate coated by materials including titanium oxide. In the meantime, a reflectivity of the reflective sheet 5 is preferably 90% or higher to suppress reflection loss on a reflective face thereof. A component having a specular-reflection property may be used. By arranging the reflective sheet 5, it is possible to enable the light emitted from the light guide plate 1 to be again directed toward the light guide plate 1 and thus to enter into the light guide plate 1, so that it is possible to improve the light usage efficiency.

<Rear Frame>

The rear frame 2 has the point light sources 3 on the side face 2b. In addition, when the rear frame 2 is made of a metal such as aluminum, it is possible to increase a heat radiation ability of the point light sources 3. In this illustrative embodiment, the rear frame 2 is made of the metal and is provided with attachment parts 2c configured to attach to another member. However, in some cases, the light guide plate 1 and the optical sheets 4 may be fixed by resin materials, and the attachment parts configured to attach to another member may be made of a resin material and may be formed at a front frame (not shown) configuring a display apparatus.

<Optical Sheet>

The optical sheets 4 arranged on the emitting face 1a of the light guide plate 1 may be configured by a combination of the lens sheet, the diffusion sheet and the like. A plurality of lens sheets in which directions of prisms are optimally combined to improve luminance may be used. In addition, two or more diffusion sheets may be used to improve diffusivity of the diffusion sheets. In addition, only one or no diffusion sheet may be used. Regarding the optical sheets 4 may be include a protective sheet, a view angle control sheet and a polarized reflection sheet. Also, it is may be used that a structure in which the lens sheet is sandwiched between the diffusion sheets. That is, the optical sheets 4 are combined depending on the desired luminance and light distribution properties.

<Point Light Source>

As the point light sources 3, light emitting diodes (LEDs) or laser diodes and the like are used. In this illustrative embodiment, the point light sources 3 are LEDs mounted on a light source substrate 31. The LED is a semiconductor light emitting device that emits monochromatic light such as blue light, a pseudo-white LED configured by fluorescent substance that absorbs a part of the blue monochromatic light emitted from the light emitting device and emits yellow light, and the like. Also, there is an LED that combines semiconductor light emitting devices of Red, Green and Blue to mix the three monochromatic lights, thereby emitting white light. In this illustrative embodiment, the pseudo-white LEDs are used. In certain utilities, the monochromatic LEDs may be used.

<Light Source Substrate>

The light source substrate 31 holds the point light sources 3 and forms a wiring pattern (not shown) to supply power to the point light sources 3. In this illustrative embodiment, the light source substrate 31 uses a flexible print cable (FPC) and mounts the point light sources 3 on the FPC. Accordingly, it is possible to efficiently transfer the heat generated from the point light sources 3 to the surroundings and to accommodate the point light sources without increasing a volume of the planar light source apparatus 100. Also, a metal substrate may be used as the light source substrate 31. By using the metal substrate, it is possible to efficiently transfer the heat generated from the point light sources 3 to the surroundings and to increase the light emitting efficiency of the point light sources 3.

<Display Device>

A display device (not shown) is arranged on the planar light source apparatus 100, so that the display apparatus is configured. It is used as the display device that a liquid crystal panel using birefringence of a liquid crystal material, a display panel in which a character, a picture and the like are printed on a transparent plate, or the like. In the liquid crystal display panel, a color filter substrate, which includes a color filter, a light shield layer, an opposite electrode and the like, and a thin film transistor (TFT) substrate, which includes a TFT becoming a switching device, a pixel electrode and the like, are arranged to face each other. The liquid crystal display panel also has a spacer, which maintains a gap between the two substrates, a seal material, which adheres the color filter substrate and the TFT substrate, a liquid crystal material, which is sandwiched between the color filter substrate and the TFT substrate, an orientation film that orientates liquid crystals and a polarization plate. The liquid crystal display panel controls orientation of a liquid crystal layer depending on ON and OFF of a voltage applied by the switching device and modulates and displays the light entered onto the liquid crystal display panel in accordance with an image signal. When the display device is provided, the planar light source apparatus and the display device are held by a front frame (not shown) and the like.

<Light Guide Plate>

In this illustrative embodiment, the light guide plate 1 is a flat plate having a uniform thickness. However, the light guide plate 1 having a wedge shape may be also used. The light guide plate is made of acrylic resin, polycarbonate resin, glass and the like, having transparency. Also, the opposite face 1b of the light guide plate 1 is formed with a light scattering part (not shown) that scatters a spreading direction of the light to guide the light emitted from the emitting face 1a in the emitting direction. The light scattering part functions for reflecting the light toward the inside of the light guide plate 1. It may be used as the light reflection part that printing dots on the opposite face 1b, roughening the opposite face 1b to form a grained face or forming a fine spherical face or unevenness.

Figure 2A:
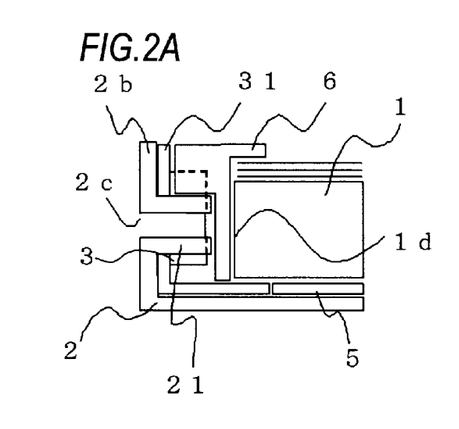
FIG. 2A and FIG. 2B illustrate sectional views taken along a line A-A at a state in which the planar light source apparatus of FIG. 1 is assembled.
Figure 2B:
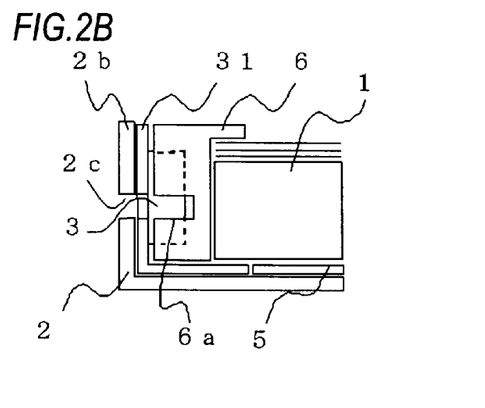

FIG. 2 illustrates a sectional view taken along a line A-A at a state in which the planar light source apparatus 100 of FIG. 1 is assembled. As shown FIG. 2A and FIG. 2B illustrating the sectional views, when it is intended to attach the planar light source apparatus 100 to another member such as external housing, at least one of the rear frame 2 and the intermediate frame 6 is formed with the attachment parts. As an example, FIG. 2A illustrates a sectional view in case that the rear frame 2 is provided with the attachment part 2c. As shown in FIG. 2A, the attachment part 2c formed at the rear frame 2 has an engagement portion 21 having a screw hole for screwing a screw (not shown) to another member. The engagement portion 21 protrudes toward the inside of the rear frame 2 (toward the side face 1d of the light guide plate 1). Also, FIG. 2B illustrates a sectional view in case that a sectional view in case that that the intermediate frame 6 is provided with an attachment part 6a. As shown in FIG. 2B, when forming the attachment part configured to attach to another member at the intermediate frame 6, the attachment part 2c of the rear frame 2 is formed into a through-hole and the attachment part 6a having a screw hole for screwing a screw (not shown) to another member is provided at a position corresponding to the attachment part 2c. In the meantime, both the attachment part 2c of the rear frame 2 and the attachment part 6c of the intermediate frame 6 may have the screw holes to fix another member by tightening together. Also, a separate member (not shown) having threads formed on a metal is may provided to both the attachment part 2c of the rear frame 2 and the attachment part 6c of the intermediate frame 6, thereby fixing the planar light source apparatus 100 and another member. Meanwhile, as shown in FIG. 1, the attachment parts 2c are formed only between the point light sources 3 mounted on the light source substrate 31. However, the attachment part 3c may be also formed at an end portion (not shown) of a mount part 311.

Figure 3:
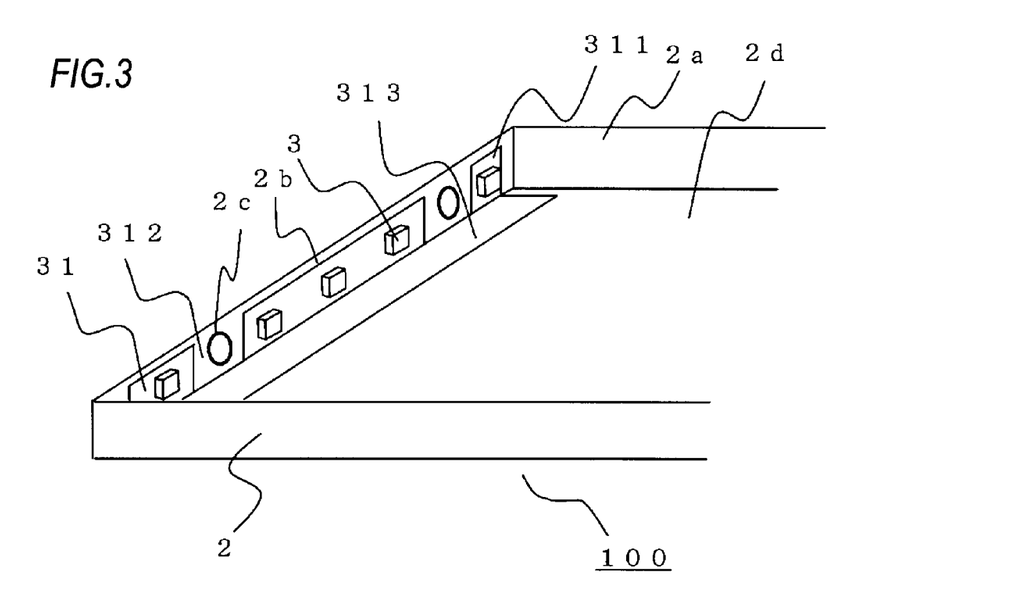
FIG. 3 illustrates an exploded perspective view of a planar light source apparatus of this disclosure.
Figure 4:
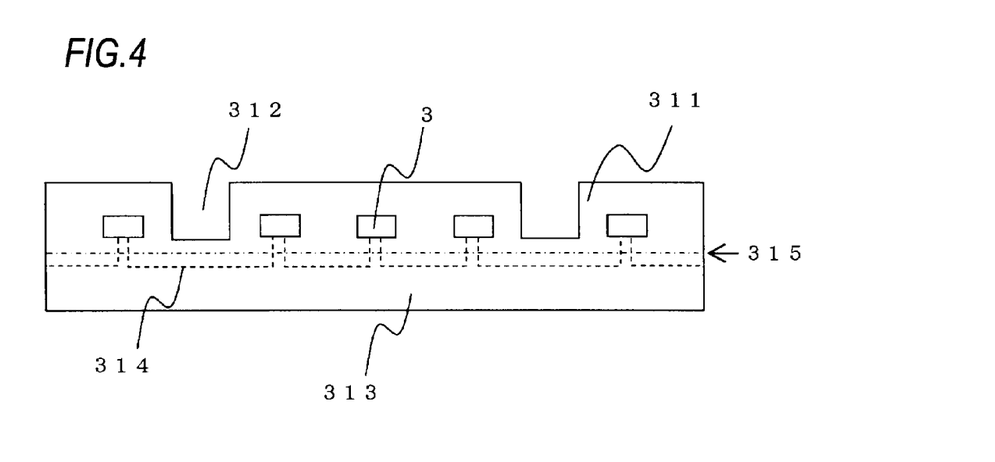
FIG. 4 illustrates a plan view of a light source substrate of this disclosure.

FIG. 3 illustrates a perspective view of the planar light source apparatus of this illustrative embodiment, which shows that the light source substrate 31 is arranged at the rear frame 2, and FIG. 4 is a plan view of the light source substrate 31. As shown in FIGS. 3 and 4, the light source substrate 31 of this illustrative embodiment has the mount part 311 of the point light sources 3, which is arranged along the side face 2b of the rear frame 2. The light source substrate 31 has cutouts or holes at positions corresponding to the attachment parts 2c configured to attach to another member, which are formed at the side face 2b of the rear frame 2. As shown in FIG. 3, cutouts 312 are formed as one example the cutout or hole. The cutout 312 has a shape that suppress interference with the attachment part, for example, a recess shape or a circular, elliptical or oval shape or a partially cut shape such as polygon.

Also, the light source substrate 31 has a wiring part 313 that forms a wiring pattern 314 to supply power to the point light sources 3 mounted on the mount part 311. The light source substrate 31 is bent at a bending line 315 to form the wiring part 313, so that the wiring part 313 is arranged on the bottom face 2d that is substantially perpendicular to the side face 2b of the rear frame 2. The wiring pattern 314 includes an input and output wiring pattern connecting an external terminal and the point light sources 3 and a wiring pattern connecting the respective point light sources 3. The point light sources 3 are mounted on parts of the wiring pattern 314 arranged at the mount part 311. In the meantime, in the light source substrate 31 shown in FIG. 3, the mount part 311 is arranged along the side face 2b of the rear frame 2 and the wiring part 313 is bent toward the bottom face 2d. However, the wiring part 313 may be bent toward the opening 2a of the rear frame 2. Also, FIG. 3 shows that the mount part 311 of the light source substrate 31 is arranged on the side face 2a. However, the mount part may be arranged on a face other than the side face 2b, such as bottom face 2d.

In the below, operations of the planar light source apparatus of this disclosure will be described. As shown in FIG. 3, in the light source substrate 31, the point light sources 3 are substantially linearly arranged on the mount face 311 so that the point light sources 3 are arranged on the side face 2b of the rear frame 2. The cutouts 312 are formed at the positions corresponding to the attachment parts 2c configured to attach to another member, which are provided on the side face 2b of the rear frame 2. Also, the wiring part 313 to supply power to the point light sources 3 is formed on the bottom face 2d continuing from the side face 2b of the rear frame 2. Since the light source substrate 2 is configured as described above, even when the attachment parts 2c configured to attach to another member are provided on the side face 2b of the rear frame 2, the light source substrate 31 having the point light sources 3 mounted thereon can be arranged on the side face 2b of the rear frame 2.

As described above, in the light source substrate 31 having the point light sources 3 mounted thereon, the cutouts 312 are formed at the positions corresponding to the attachment parts 2c configured to attach to another member. According to the planar light source apparatus 100 of this illustrative embodiment, even when the attachment parts 2c is provided at the side face 2b of the rear frame 2, it is possible to suppress the interference between the attachment parts 2c and the light source substrate 31 and possible to arrange the light source substrate 31 on the side face of the rear frame 2. Thereby, in the planar light source apparatus 100, the degree of freedom of the arrangement position of the light source substrate 31 having the point light sources 3 mounted thereon is not restrained. Also, since it is possible to arrange the attachment parts 2c configured to attach to another member and the point light sources 3 on the same side face, it is possible to suppress the frame of the planar light source apparatus 100 from being larger or thicker due to the arrangement positions of the attachment parts 2c configured to attach to another member and the point light sources 3. Thereby, it is possible to provide the planar light source apparatus of a thin type having a narrow frame.

Also, the light source substrate 31 is configured such that the wiring part 313 is bent toward the bottom face 2d of the rear frame 2 and is arranged on the bottom face 2d of the rear frame 2. Accordingly, it is possible to radiate the heat generated from the point light sources 3 to the bottom face 2d having a larger area than the side face 2b of the rear frame 2, so that it is possible to increase the heat radiation ability of the point light sources 3.

In recent years, a point light source having an improved output per one point light source and high luminance has been provided. Accordingly, the minimum number of the point light sources 3 necessary to satisfy the desired luminance is being decreased in the planar light source apparatus 100. In case that planar light source apparatus has little degree of arrangement freedom of the light source substrate 31 and the light source substrate 31 having the point light sources 3 is mounted only on the long side 1c being the first side face, in order to realize the desired luminance, many point light sources 3 is needed to remove a light-dark difference between the point light sources 3 even though the point light sources 3 having the high output are used. According to this disclosure, since the degree of arrangement freedom of the light source substrate 31 having the point light sources 3 mounted thereon is improved, it is possible to arrange the point light sources 3 on the short side being the second side face 1d. Thus, it is possible to reduce the number of the point light sources 3 needed in the planar light source apparatus 100. Therefore, even when the number of the point light sources 3 is small, it is possible to satisfy the desired luminance and to improve the uniformity of the luminance, which can contribute to the reductions of the cost and weight.

Modified Embodiments

Figure 5:
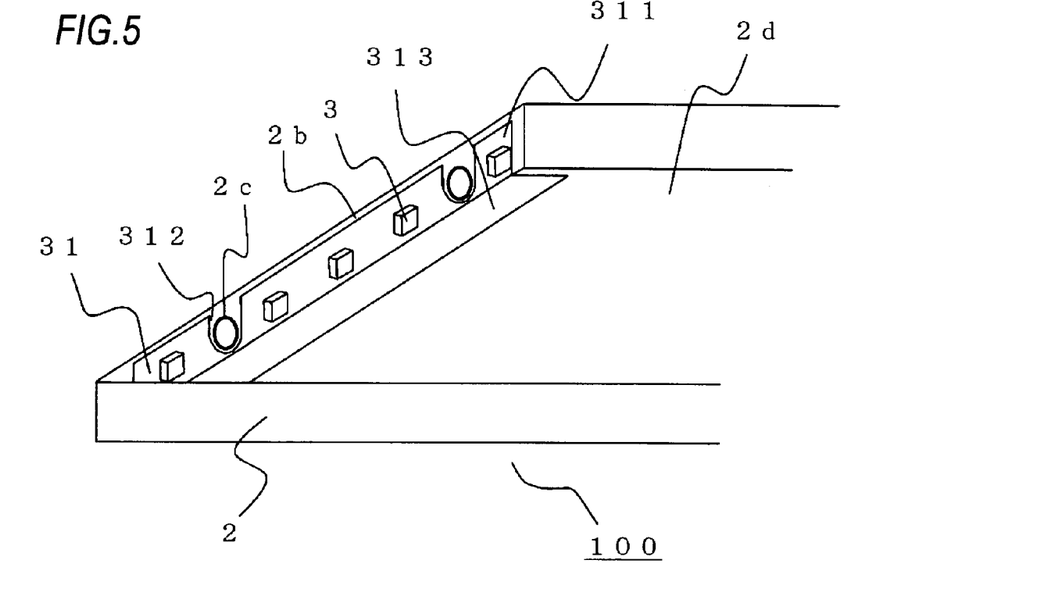
FIG. 5 illustrates an exploded perspective view of a planar light source apparatus of this disclosure.
Figure 6:
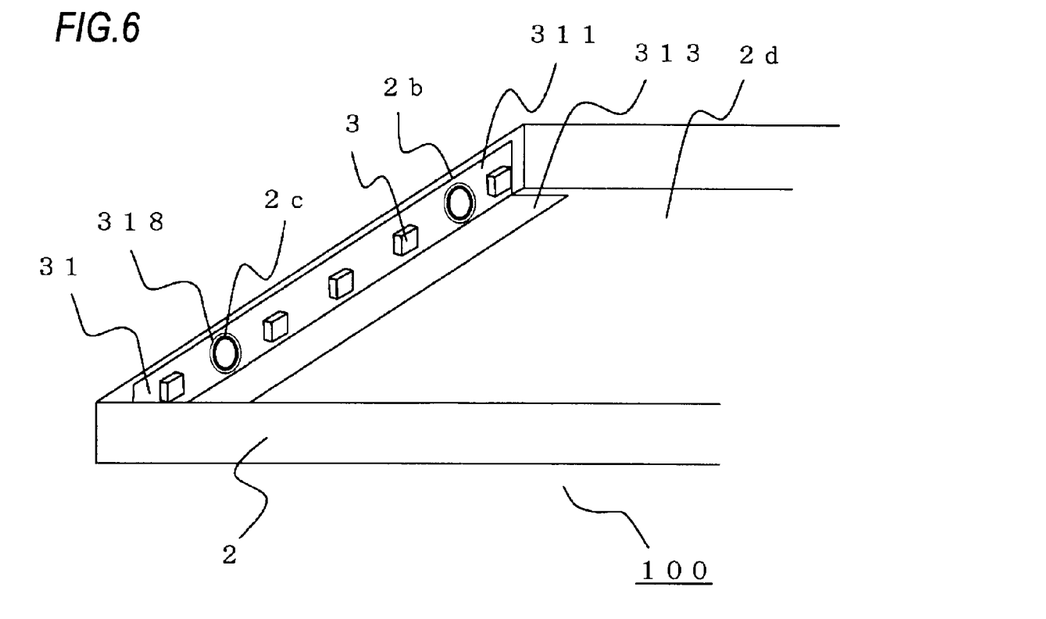
FIG. 6 illustrates an exploded perspective view of a planar light source apparatus of this disclosure.

FIGS. 5 and 6 illustrate modified embodiments of the planar light source apparatus of this disclosure. The cutout 312 has a circular-arc or polygonal shape, which can be appropriately determined depending on conditions such as the shape of the attachment part 2c of the rear frame 2 of the planar light source apparatus 100, the wiring routing of the light source substrate 31, the number of the light source substrates 31 to be obtained during the manufacturing thereof, and the like. As shown in FIG. 5, when the attachment part 2c configured to attach to another member, which is formed at the rear frame 2, is circular, the cutout 312 is formed into a notch shape including a circle in correspondence to the circular shape. Like this, the cutout 312 is formed into the shape corresponding to the attachment part 2c, so that it is possible to perform the positioning of the light source substrate 31. Also, a circular hole 318 may be formed in correspondence to the circular attachment part 2c, as shown in FIG. 6. By forming the hole 318 at the position corresponding to the attachment part 2c, it is possible to perform the positioning of the light source substrate 31 more accurately, compared to the case where the cutout 312 is formed.

Figure 7:
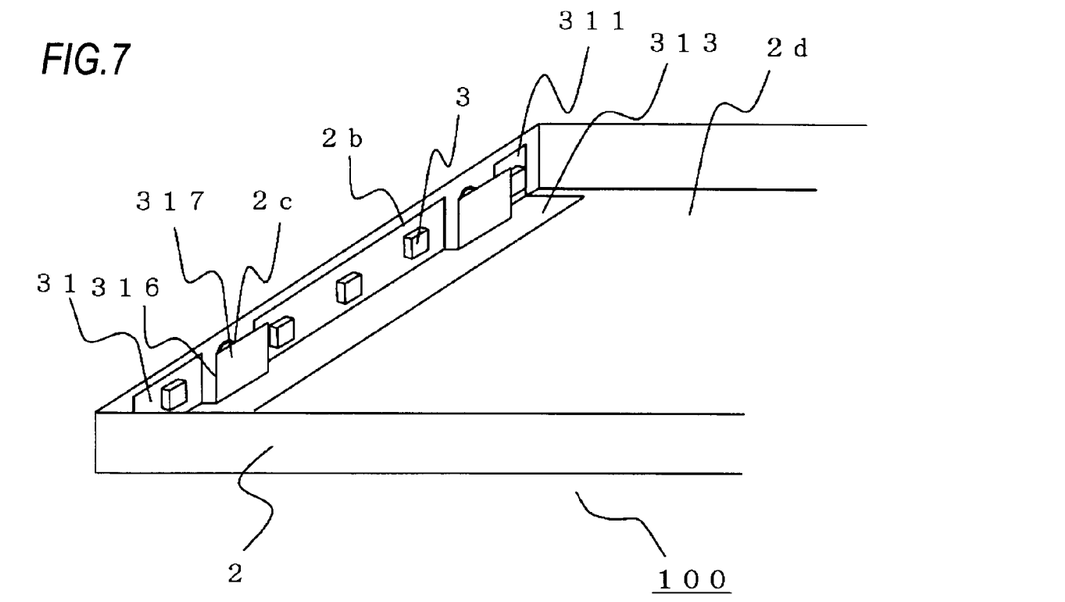
FIG. 7 illustrates an exploded perspective view of a planar light source apparatus of this disclosure.

FIG. 7 illustrates another modified embodiment of the planar light source apparatus of this disclosure. As shown in FIG. 7, a slit 316 is formed at a position of the light source substrate 31 corresponding to the attachment part 2c configured to attach to another member and a bent part 317 provided by the slit 316 is arranged in correspondence to the attachment part 2c of the rear frame 2. Thereby, it is possible to suppress the foreign substances, which are introduced from the attachment part 2c of the rear frame 2, from entering the inside of the planar light source substrate 100.

Figure 8:
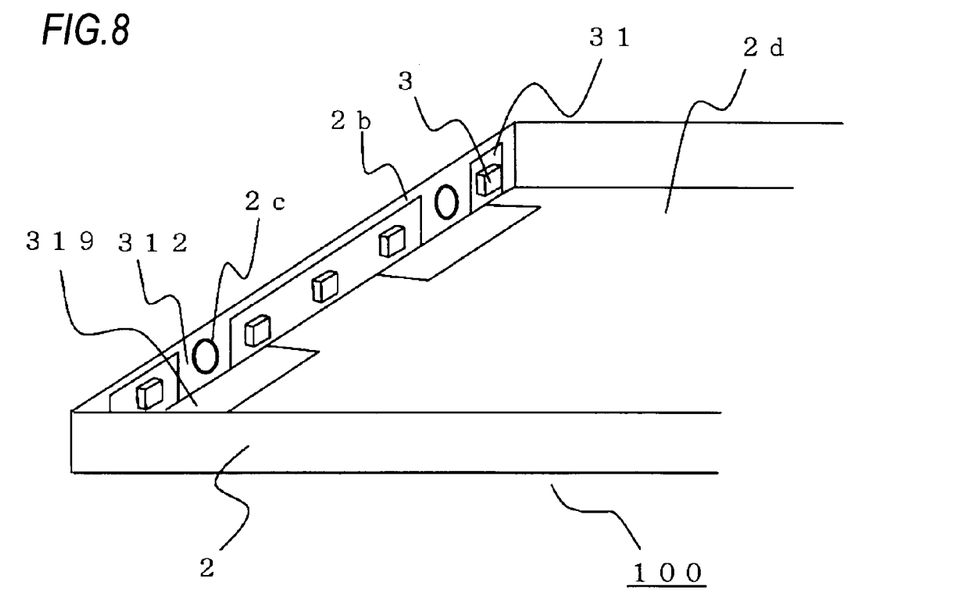
FIG. 8 illustrates an exploded perspective view of a planar light source apparatus of this disclosure.
Figure 9:
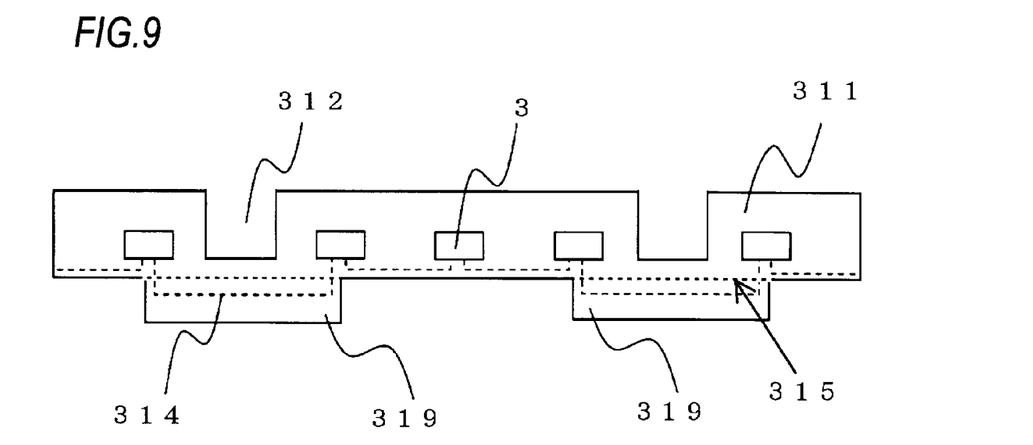
FIG. 9 illustrates a plan view of a light source substrate of this disclosure.

Also, FIG. 8 illustrates another modified embodiment of the planar light source apparatus 100 of this disclosure and FIG. 9 is a plan view of the light source substrate 31 to be arranged in the planar light source apparatus 100 of FIG. 8. The wiring part 313 in the above-described embodiments has the same rectangular shape as the mount part 311 of the light source substrate 31, as shown in FIG. 4. However, the light source substrate 31 in this modified embodiment as shown in FIGS. 8 and 9 has wiring parts 319, which are partitioned and are provided at positions corresponding to the cutouts 312 for the attachment parts 2c of the rear frame 2. As shown in FIG. 8, the partitioned wiring parts 319 are bent toward the bottom face 2d of the rear frame 2. Also, as shown in FIG. 9, the wiring pattern 314 corresponding to the cutouts 312 is formed in the partitioned wiring parts 319. According to this modified embodiment, it is possible to minimize the necessary volume of the light source substrate 31 and to thus reduce the materials to be used, so that the reductions of the cost and weight are achieved. In the meantime, the cutout 312 of the light source substrate 31 and the partitioned wiring part 319 may have the similar shape, and each of the partitioned wiring parts 319 may have the similar shape. Accordingly, by appropriately setting the shape of the wiring part 319 of the light source substrate 31, it is possible to efficiently produce the light source substrate 31, thereby suppressing the manufacturing cost.

Figure 10:
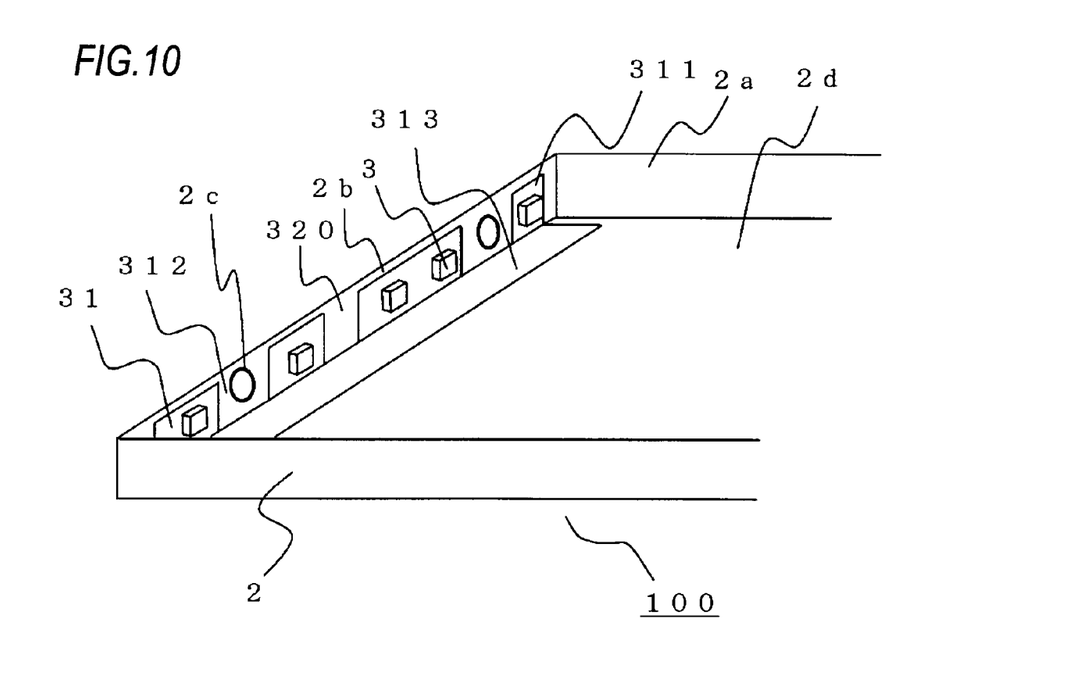
FIG. 10 illustrates an exploded perspective view of a planar light source apparatus of this disclosure.

Also, FIG. 10 illustrates another modified embodiment of the planar light source apparatus 100 of this disclosure. As shown in FIG. 10, only the parts on which the point light sources 3 are mounted are adhered to the rear frame 2. Also, it is not necessarily to provide the cutouts or holes only at the positions corresponding to the attachment parts 2c of the rear frame 2 of the planar light source apparatus. That is, as shown with a reference numeral 320 in FIG. 10, the cutout or hole may be provided at a part not corresponding to the attachment parts 2c. A shape of the light source substrate 31 may be formed into an arbitrary shape as required, in view of the minimization and efficient production of the light source substrate 31.

Figure 11A:
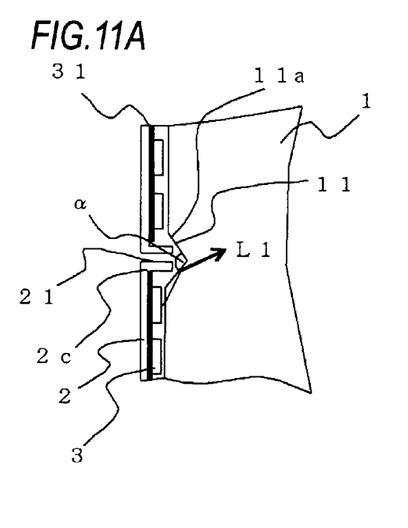
FIG. 11A and FIG. 11B illustrates an enlarged view of a notch of a planar light source apparatus of this disclosure.
Figure 11B:
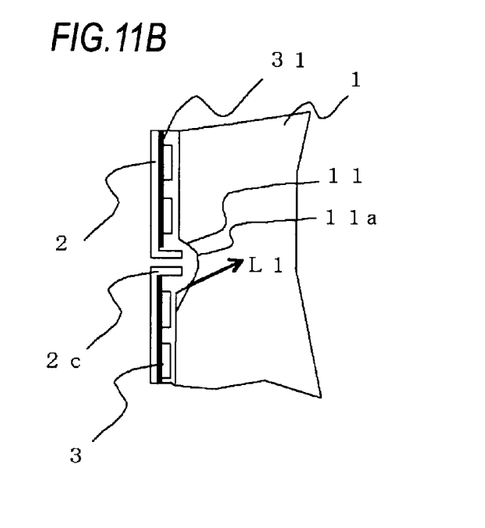

FIG. 11 illustrates another modified embodiment of the planar light source apparatus 100 of this disclosure. As shown in FIG. 11, when the planar light source apparatus 100 includes the light guide plate 1, the second side face 1d of the light guide plate 1, to which the point light sources 3 are opposite, is provided with a notch 11 at a position corresponding to the attachment part 2c configured to attach to another member of the rear frame 2, i.e., at a position between the point light sources 3. As shown in FIGS. 11A and 11B, a shape of the notch 11 is linear or curvilinear, when seen from a plan view. The notch 11 shown in FIG. 11A has a linear shape. FIG. 11B illustrates the light guide plate 1 having the curvilinear notch 11 when seen from a plan view. Like this, since the notch 11 is arranged between the point light sources 3, it is possible to make the light, which is emitted from the point light sources 3 and enters into the light guide plate 3, into the reflected light L1 that is reflected on a face 11a formed by the notch 11, and to spread that in a direction of a display area. Accordingly, it is possible to suppress the non-uniformity of the luminance on the side face 1d of the light guide plate 1, which is caused by the arrangement position of the attachment part 2c configured to attach to another member, at which the light is not illuminated (between the point light sources 3). In the meantime, the notch 11 may be provided between the point light sources 3 other than at the position corresponding to the attachment part 2c. The non-uniformity of the luminance may be caused by the arrangement positions of the point light sources 3, i.e., the non-uniformity between a part adjacent to the point light sources 3, at which it is bright, and a part corresponding between the point light sources 3, at which it is dark. By forming the notch 11 other than at the position corresponding to the attachment part 2c, it is possible to suppress the non-uniformity of the luminance at the side face 1d of the light guide plate 1 opposite to the point light sources 3. In the meantime, as shown in FIG. 11A, when the notch 11 has a V shape, a vertex angle α of the V shape may be made to be 80 degrees or larger, preferably. When the vertex angle α of the V shape is made to be 80 degrees or larger, the light does emit from the notch 11 having the V shape by exceeding a critical angle. For example, when a light guide plate is made of Poly Methyl Methacrylate (PMMA) and the vertex angle α of the V shape is made to be α≥84.3 degrees, it is possible to totally reflect the light emitted from a light source and to spread in the direction of the display area without emitting the light to the outside of the light guide plate. Also, when the notch 11 has the curvilinear shape, it is possible to continuously change the reflection angle of the light. In addition, it is possible to determine the spreading direction of the light by appropriately selecting the shape of the notch 11, depending on the arrangement of the light sources and the position of the notch 11.

Figure 12:
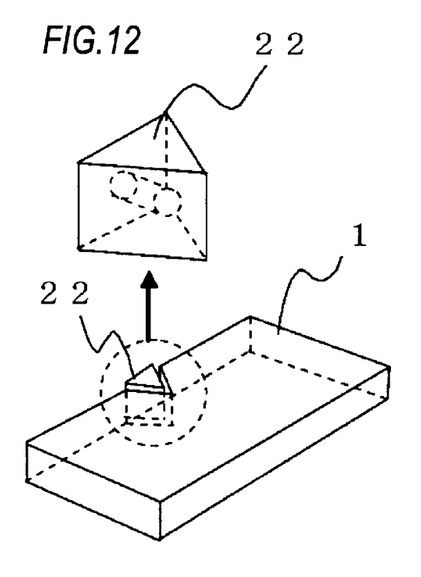
FIG. 12 illustrates an enlarged view of a notch of a planar light source apparatus of this disclosure.

As shown of FIG. 11 illustrating an enlarged view of the notch of the planar light source apparatus, when the attachment part 2c of the rear frame 2 has the engagement portion 21 having a screw hole, into which a screw configured to attach to another member is inserted, the engagement portion 21 is arranged inside the notch 11. As shown in FIG. 12 illustrating an enlarged view of the notch, when the intermediate frame 6 has the engagement portion or when another engagement member 22 is used, the engagement portion or another engagement member is also arranged inside the notch 11. By providing the light guide plate 1 having the notch 11, it is possible to arrange the protrusion portion of the engagement portion 21 or engagement member 22 inside the notch 11, so that it is possible to realize a narrow frame in the display apparatus.

The face 11a of the notch 11 may be a specular face or roughened face. For example, when the face 11a of the notch 11 is roughened, it is possible to scatter the light emitted from the point light sources 3, so that it is possible to achieve a pseudo effect of an arrangement of light sources. Also, when the face 11a of the notch 11 is a specular face, it is possible to reflect the light emitted from the point light sources 3 toward the direction of the display area, thereby improving the light usage efficiency.

Figure 13:
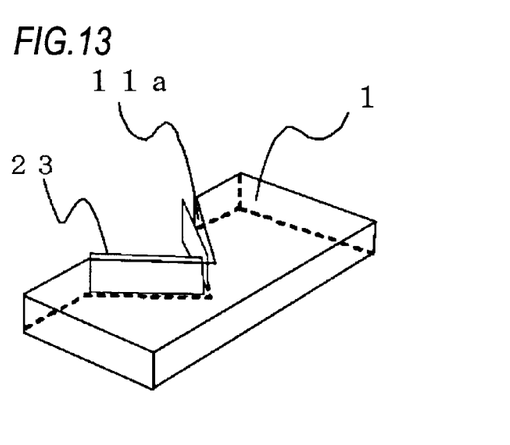
FIG. 13 illustrates an enlarged view of a notch of a planar light source apparatus of this disclosure.

As described above, it is possible to appropriately select the shape and face treatment of the notch 11 depending on the positional relation of the light sources, and the like. Additionally, as shown in FIG. 13 illustrating an enlarged view of a notch, by arranging an optical sheet 23 such as reflective sheet between the rear frame 2 and the notch 11 of the light guide plate 1, it is possible to improve the light usage efficiency. When the reflective sheet is arranged, it is possible to enable the light emitted (leaked) from the light guide plate 1 to again enter into the light guide plate 1, thereby increasing the light usage efficiency. Alternatively, it may be possible to improve the light usage efficiency by performing a chemical process, for example silver vapor deposition, on the face 11a of the notch 11 of the light guide plate 1.

Also, when the rear frame 2 is provided with the protruding engagement portion 21 as shown in FIG. 11, an adhesion material may be arranged at a leading end of the engagement portion 21. When the adhesion material is arranged at a leading end of the engagement portion 21, it is possible to suppress the foreign substances, which are generated when inserting the screw, from being introduced into the planar light source apparatus. Also, even when the screw is not inserted into the engagement portion 21, it is possible to suppress the foreign substances from being introduced into the planar light source apparatus from the outside. Further, when the black adhesion material having low transmittance is used in case that the engagement portion 21 is not inserted, it is possible to suppress the light from being leaked from the inside of the planar light source apparatus to the outside.

Additionally, when arranging the light source substrate 31, the light source substrate 31 is adhered to the rear frame 2 by an adhesion material and the like. The wiring part 313, which is an area bent toward the bottom face 2d of the rear frame 2, may be fixed to the bottom face 2d of the rear frame 2 by an adhesion material and the like or may not be fixed.

Also, a colored printing may be performed on the face of the light source substrate 31 (which is not shown). By performing the colored printing (for example, white printing) on the face of the light source substrate 31, it is possible to reflect the light on the light source substrate 31, so that it is possible to suppress the light absorption on the light source substrate 31 and to suppress the decrease in luminance of the planar light source apparatus, thereby increasing the light usage efficiency.

This disclosure is not limited to the above-described illustrative embodiments. That is, a variety of changes and modifications can be made without departing from the scope of this disclosure. For example, the light source substrate 31 may be an MCPCB, and the types and arrangement positions of the light sources and the light guide plate can be also appropriately selected.

What is claimed is:

1. A planar light source apparatus comprising:
a light source substrate including:
a plurality of point light sources;
a mount part, on which the point light source is mounted; and
a wiring part, which has a wiring pattern to supply power to the point light source;
a frame including:
one face, along which the mount part of the light source substrate is arranged and
an attachment part, which is formed on the one face and which is configured to attached to an external housing,
wherein the light source substrate includes a cutout at a position corresponding to the attachment part of the frame,
wherein an area of the wiring part is continuously provided from the mount part and is bent with respect to the one face,
wherein the attachment part is located between the point light sources;
wherein a light guide plate has a side face arranged to be opposite to the point light source,
wherein the side face of the light guide plate is provided with a notch at a position corresponding to the attachment part formed at the frame, and
wherein the notch of the light guide plate has one of V-shape and a curvilinear shape as viewed from a plan view of the light guide plate.

2. The planar light source apparatus according to claim 1, wherein the cutout has a shape corresponding to the attachment part.

3. The planar light source apparatus according to claim 1, wherein the wiring part is partitioned into a plurality of parts and is continuously provided from the mount part.

4. The planar light source apparatus according to claim 1, wherein the frame is configured by at least an inner side face, and the attachment part is arranged on the inner side face.

5. The planar light source apparatus according to claim 1, wherein the attachment part formed at the frame has an engagement portion that protrudes toward the side face of the light guide plate, and
wherein the engagement portion is arranged inside the notch formed at the light guide plate.

6. The planar light source apparatus according to claim 1, wherein a face of the notch of the light guide plate is either a specular face or roughened face.

7. The planar light source apparatus according to claim 5, wherein an adhesion material is provided at a leading end of the engagement portion.

8. The planar light source apparatus according to claim 1, wherein an optical sheet is provided at a surface of the notch of the light guide plate.

9. The planar light source apparatus according to claim 1, wherein a surface of the notch of the light guide plate is processed by a chemical process.

10. A display apparatus comprising:
a display device arranged at a position facing to the planar light source apparatus according to claim 1.

11. A planar light source apparatus comprising:
a light source substrate including:
a point light source;
a mount part, on which the point light source is mounted; and
a wiring part, which has a wiring pattern to supply power to the point light source;
a frame including:
one face, along which the mount part of the light source substrate is arranged; and
an attachment part, which is formed on the one face, wherein the light source substrate has a bent part at a position corresponding to the attachment part of the frame, the bent part formed by a slit provided to the mount part, and wherein an area of the wiring part is continuously provided from the mount part and is bent with respect to the one face.

* * * * *